United States Patent
Haddad et al.

[11] Patent Number: 6,118,371
[45] Date of Patent: Sep. 12, 2000

[54] ADAPTIVE VEHICLE LIGHTING CONTROL SYSTEM

[75] Inventors: Ayed N. Haddad, Plymouth; Marian Mirowski, Bloomfield Hills; John E. Martus, Livonia; Charlie T. Accad, Warren, all of Mich.

[73] Assignee: Chrysler Corporation, Auburn Hills, Mich.

[21] Appl. No.: 09/086,037

[22] Filed: May 28, 1998

[51] Int. Cl.[7] ..................................... B60Q 11/00
[52] U.S. Cl. ........................... 340/458; 340/469; 315/82; 315/83; 315/90; 315/91; 315/93; 307/10.8
[58] Field of Search ..................... 340/458, 468, 340/469; 315/77, 82, 83, 88, 90, 91, 93; 307/10.8

[56] References Cited

U.S. PATENT DOCUMENTS

| | | | |
|---|---|---|---|
| 4,684,819 | 8/1987 | Haag et al. | 307/10.8 |
| 5,057,814 | 10/1991 | Onan et al. | 340/458 |
| 5,081,565 | 1/1992 | Nabha et al. | 362/465 |
| 5,245,251 | 9/1993 | Irick | 315/82 |
| 5,517,064 | 5/1996 | Murakami | 307/10.1 |
| 5,639,155 | 6/1997 | Kowall et al. | 362/66 |
| 5,680,098 | 10/1997 | Bejster et al. | 340/458 |

Primary Examiner—Julie Lieu
Attorney, Agent, or Firm—James R. Yee

[57] ABSTRACT

A novel vehicle lighting control circuit for reducing the light intensity of a vehicle lighting element via pulse width modulation. A pulse width modulation adjuster is provided for producing a pulse width modulation control signal in order to operate the vehicle lighting element at a reduced light intensity. Such examples for use of the present invention include, but are not limited to, operation of: high beams at a low beam light intensity; daytime running lamps (DRLs); power balancing functions; and emergency lights.

6 Claims, 7 Drawing Sheets

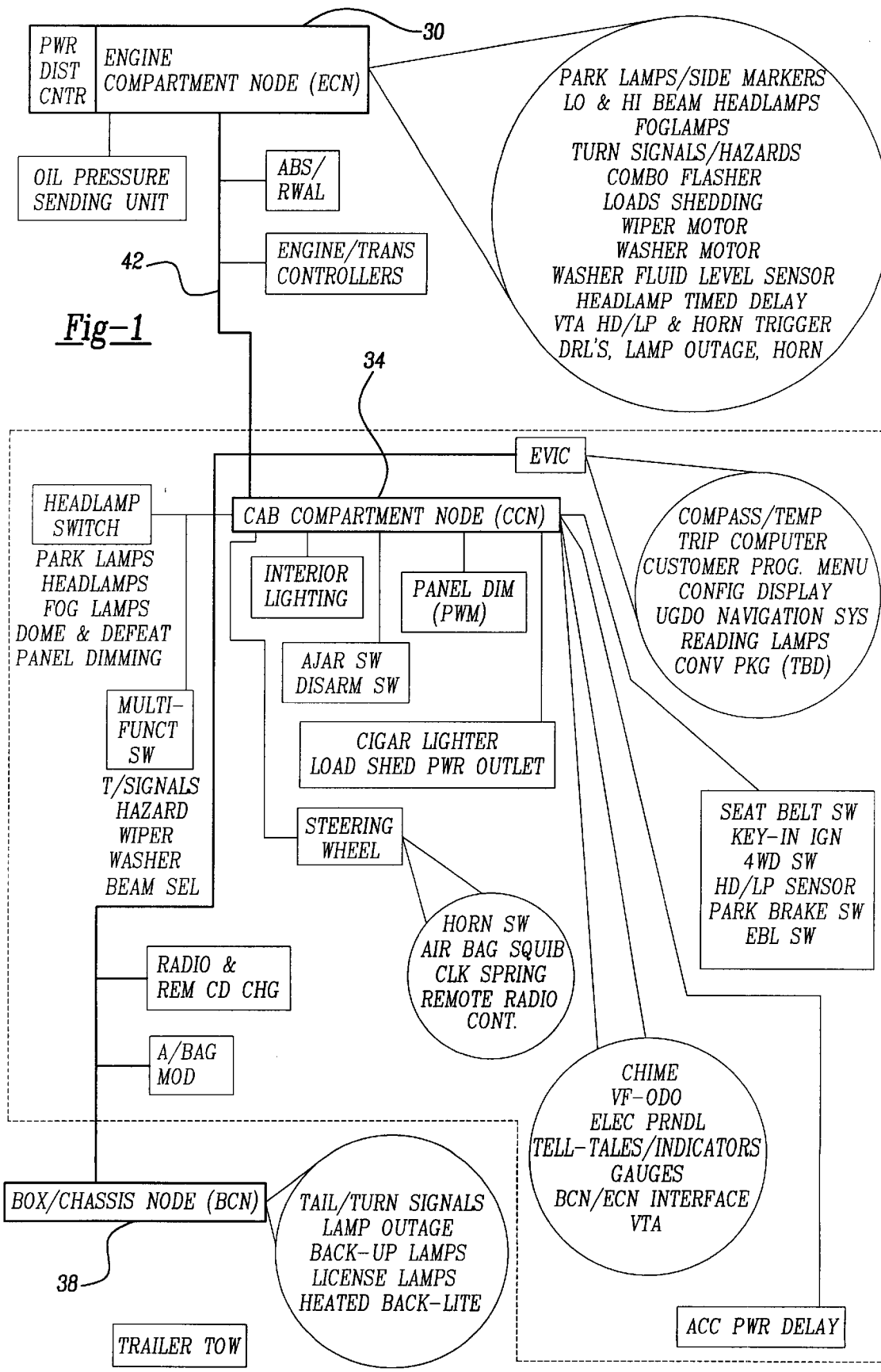

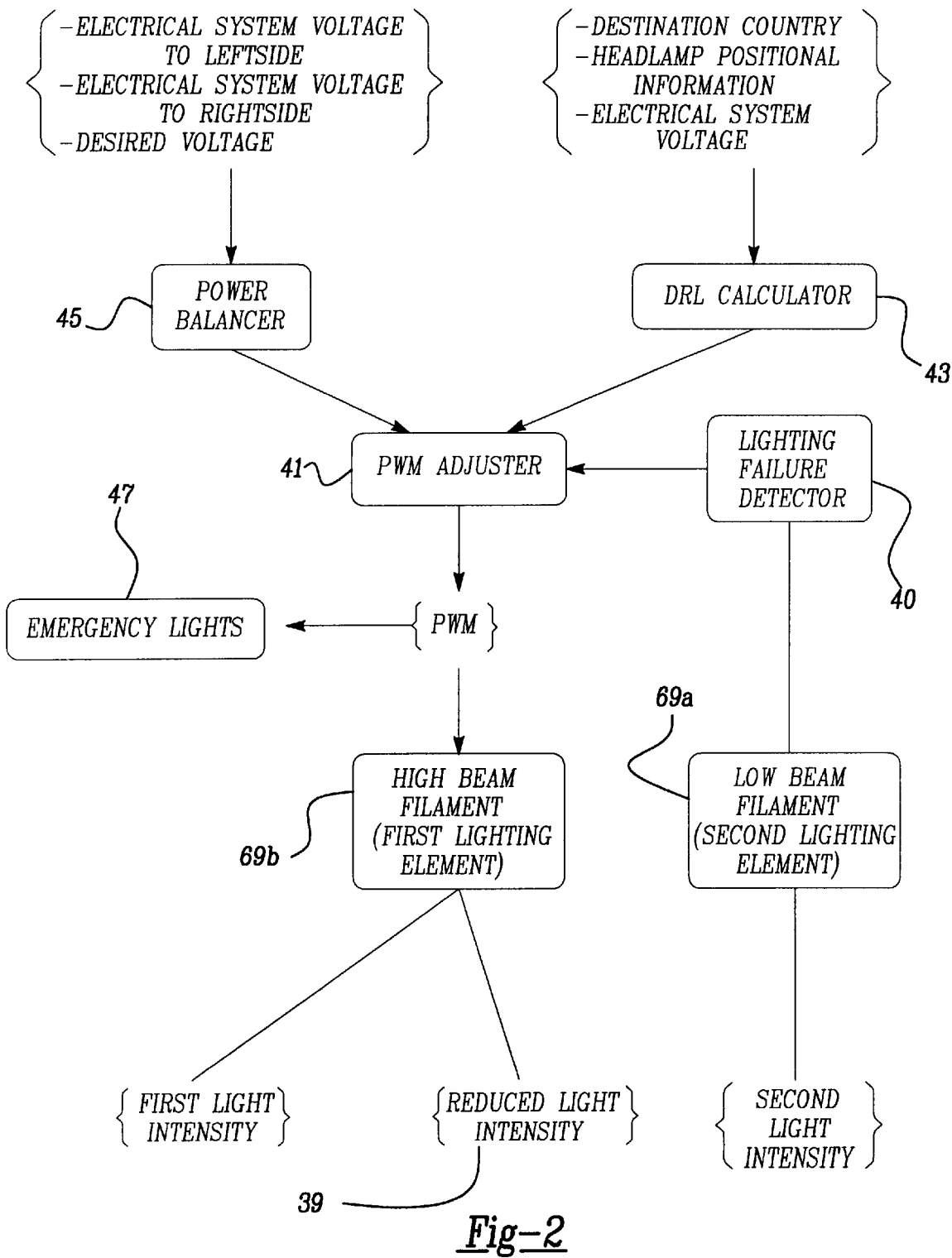

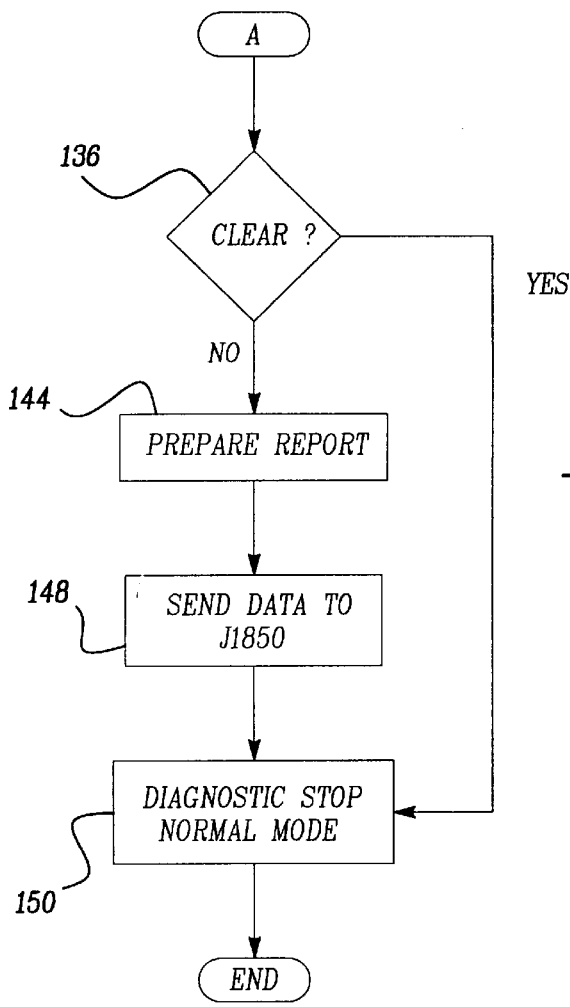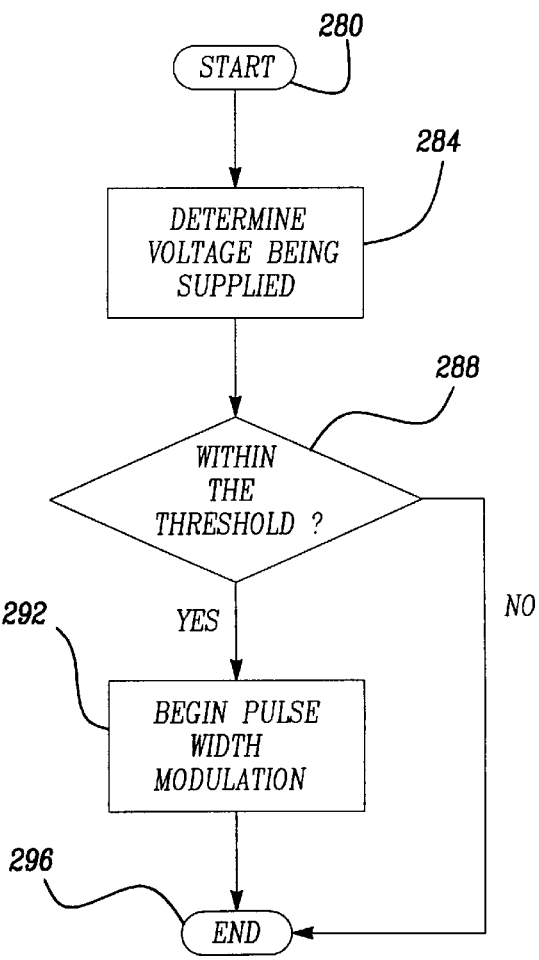

ADAPTIVE VEHICLE LIGHTING CONTROL SYSTEM

BACKGROUND OF THE INVENTION

1. Technical Field

The present invention relates generally to vehicle controllers and more particularly to vehicle lighting systems.

2. Discussion

Safe operation of a vehicle is inextricably linked with the proper functioning of a vehicle's headlamps. Not only are functioning headlamps a necessity for night-time driving of a vehicle, but certain countries (such as Canada) require the headlamps to be used during the daytime as well.

Lighting filaments within a vehicle's headlamps typically have an approximate life expectancy of 2000 hours. Since the low beam filaments are typically used more often than the high beam filaments, the low beam filaments invariably and without much warning fail sooner than the high beam lighting filaments. This situation leaves the vehicle's driver with few options but to operate the vehicle at high beams at night until the headlamps are fixed at some future date.

Accordingly, there is a need to provide a vehicle lighting control system that would be able to overcome these disadvantages as well as other disadvantages that occur in vehicle lighting systems. Furthermore, there is a need to provide a vehicle lighting control system that would accommodate, without the need for special and/or additional components, a daytime running lamp (DRL) system that is adaptable to the various vehicle build configurations.

SUMMARY OF THE INVENTION

In accordance with the teachings of the present invention, a novel vehicle lighting control circuit is provided for reducing the light intensity of a vehicle lighting element via pulse width modulation. A pulse width modulation adjuster is provided for producing a pulse width modulation control signal in order to operate a vehicle lighting element at a reduced light intensity. Such examples for use of the present invention include, but are not limited to, operation of: high beams at a low beam light intensity; daytime running lamps (DRLs); power balancing functions; and emergency lights.

BRIEF DESCRIPTION OF THE DRAWINGS

Other objects and advantages of the invention will become apparent upon reading the following detailed description and upon reference to the drawings, in which:

FIG. 1 is a schematic diagram illustrating network interconnections among vehicle controller components;

FIG. 2 is a flow diagram depicting the data and control flow of the present invention.

FIGS. 5a–5b are flowcharts depicting the processing steps involved in performing headlamp diagnostics in accordance with the teachings of the present invention;

FIG. 7 is a flow chart depicting the processing steps involved in performing power balancing in accordance with the teachings of the present invention.

DETAILED DESCRIPTION OF THE PREFERRED EMBODIMENT

Figure 3A:
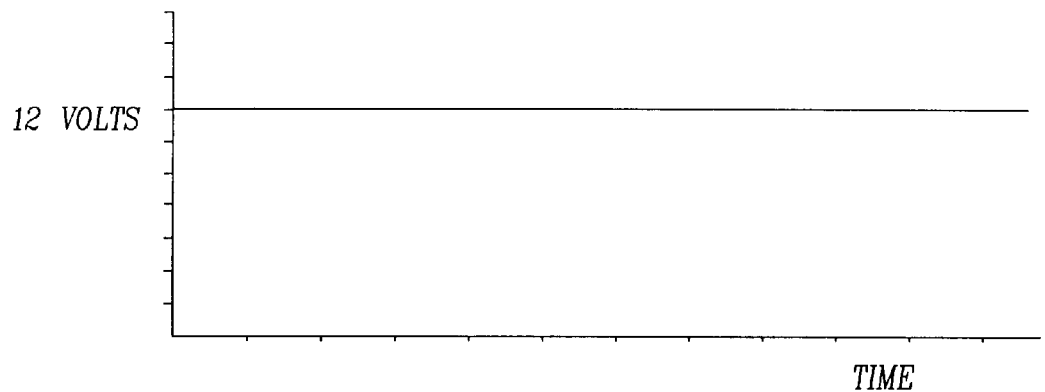
FIGS. 3a–3b are x-y graphs respectively depicting the saturation mode and pulse width modulation mode for operating a vehicle's headlamp.

FIG. 1 depicts the network interconnections among several controllers located within a vehicle for regulating the vehicle's electrical equipment. The controllers include an engine compartment node controller 30 that is in data communication with a cab compartment node controller 34 and with a box/chassis node controller 38.

Engine compartment node controller 30 regulates such components as low and high beam headlamps as well as daytime running lamps (DRLs). Engine compartment node 30 communicates the status of the electrical equipment that is under its control to the other controllers across network 42. Moreover, engine compartment node 30 receives information about other components of the vehicle from the other controllers across network 42. Network 42 preferably operates according to the Society of Automotive Engineers (SAE) J1850 Communications Standard.

Referring to FIG. 2, the engine compartment node controller is provided with the capability of operating a high beam filament 69b at a reduced light intensity 39. This capability allows the high beam filament 69b to function at a low beam light intensity when low beam filament 69a has failed.

High beam filament 69b normally operates in a saturation power mode with a voltage profile as depicted in FIG. 3a. In a saturation power mode, high beam filament 69b receives the full amount of power available from a vehicle's electrical system.

Referring back to FIG. 2, when lighting failure detector 40 detects that low beam filament 69a has failed, the system switches from the saturation power mode to a pulse width modulation (PWM) power mode. In the PWM power mode, PWM adjuster module 41 adjusts the electrical signals being provided to high beam filament 69b so that they are pulse width modulated. The PWM mode allows high beam filament 69b to generate light at an intensity approximate to that of the failed low beam filament 69a with the period of the pulse width being calculated according to the following equation:

where:

V=Voltage;

T=Period t=time; and v=instantaneous voltage.

Figure 3B:
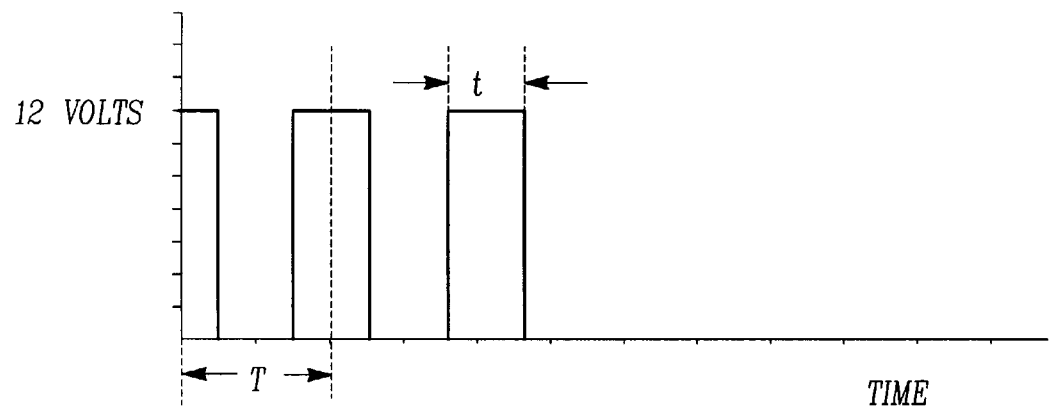

FIG. 3b depicts the PWM power mode wherein the voltage profile is based upon equation 1.

For example, if the saturation power mode fully powers a 65 watt headlamp (i.e., operate the headlamp at a high beam level), then operation of the same 65 watt headlamp in a PWM power mode produces less light. With the correct PWM factor as determined by equation 1 being used, the 65 watt headlamp operates as a low beam headlamp.

The present invention includes storing the particular PWM period for operating the high beam filaments in a low beam mode. This obviates the need for recalculating the period (i.e., the pulse width factor) each time the high beam filaments are to be operated in this mode.

Referring back to FIG. 2, the capability of operating a high beam filament 69b at a reduced light intensity 39 allows the high beam filament 69b to also function as a daytime running lamp (DRL). DRL calculator 43 is provided to determine whether the DRL capability of the present invention is to be utilized based upon the destination country of the vehicle.

DRL calculator 43 also determines the PWM factor in order to operate the high beam filament at the proper DRL light intensity. This determination is based upon the position of the headlamp on the vehicle and upon the electrical system voltage. DRL calculator 43 utilizes the PWM adjuster module 41 to provide pulse width modulation to operate the high beam filament 69b at a reduced light intensity. Typically, DRLs are operated below 50 watts per each bulb. An exemplary calculation is as follows for Canada:

---

*60 Hz and 35% Duty Cycle
*Vpwm = 16*SQRT(t/T) = 16*SQRT(0.35) = 9.5 Volts
*Ibulb = 5.08 (9.5/12.8) 0.51 = 4.3 Amps
*Power = 9.5 * 4.3 = 40.85 Watts

---

The present invention includes storing the particular pulse width factor (i.e., period) for operating the high beam filaments in a DRL mode. This obviates the need for recalculating the pulse width factor each time the high beam filaments are to be operated in this mode.

The present invention additionally provides a power balancer 45 that determines whether the electrical power being supplied to the filaments of the headlamps has fluctuated to such an extent that it needs to be adjusted in order to remain within a predetermined threshold. For example, if the power from the vehicle's electrical system suddenly started to supply power at a much higher voltage (e.g., 15 volts) than normal, then power balancer 45 indicates to PWM adjuster module 41 to begin pulse width modulation. The information from the power balancer 45 is available to other systems that are connected to the network.

Moreover, the present invention provides for providing pulse width modulation for emergency lights 47 that may be on such a vehicle as a police car. The pulse width modulation of the PWM adjuster module 41 allows the lights of a vehicle to operate in an emergency capacity. This capacity includes rapidly altering the light intensity via pulse width modulation of the lights on the vehicle. Activation of the pulse width modulation of emergency lights 47 is preferably through an emergency lights activation switch which is readily accessible to the operator of the vehicle. The information regarding the emergency lights operations is available to other systems that are connected to the network.

Figure 4:
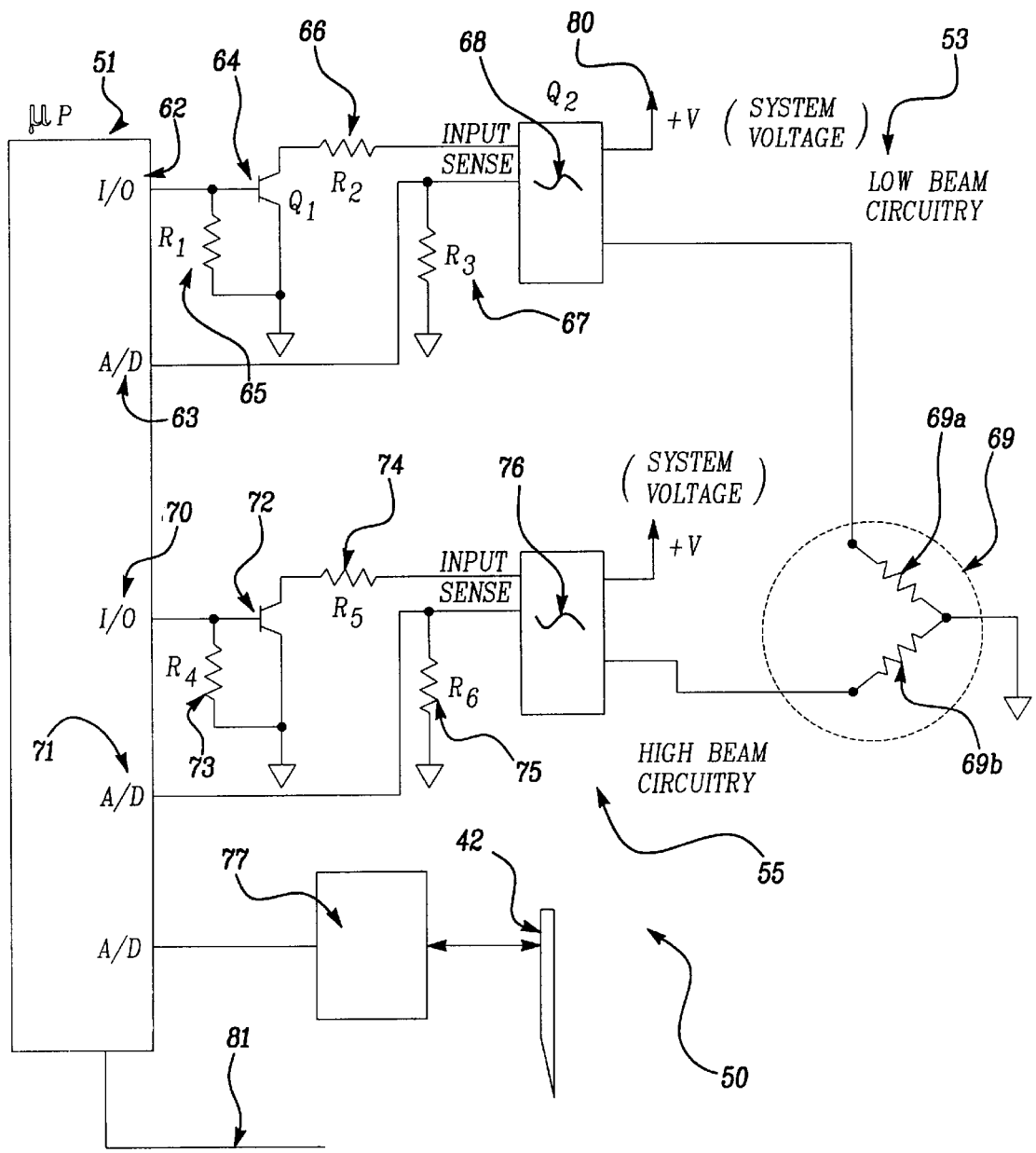
FIG. 4 is a circuit diagram of the headlamp controller of the present invention.

FIG. 4 depicts the control circuit 50 within the engine compartment node for controlling the light intensity of a vehicle's headlamp. This novel circuit 50 is specially configured to provide pulse width modulation so that a filament that normally operates at a higher light intensity can be operated at a reduced light intensity. The capability of using a filament at a different light intensity is particularly useful when the low beam headlamp filament is no longer operational. The present invention allows the high beam filament to operate at the light intensity of the inoperational low beam headlamp.

Within circuit 50, microprocessor 51 controls low beam circuitry 53 and high beam circuitry 55 through input/output (I/O) ports 62 and 70 and receives feedback from circuitry 53 and 55 through analog-to-digital (A/D) data ports 63 and 71. Microprocessor 51 within the preferred embodiment is a Motorola AS20 microprocessor. Microprocessor 51 communicates with network 42 via a multi-bus adaptor chip 77. For the preferred embodiment, the multi-bus adaptor chip 77 is the Harris chip 0481353AC.

Headlamp assembly 69 contains both low beam filament 69a and high beam filament 69b. Low beam filament 69a is normally operated at a light intensity of 55 watts for the United States market and typically at 50 watts for vehicles exported outside the United States. High beam filament 69b is normally operated at a light intensity of 65 watts for the United States market and for vehicles exported outside the United States. The low beam filament is within this non-limiting example a 55 watt filament. High beam filament 69b is within this non-limiting example a 65 watt filament.

Microprocessor 51 activates pre-driver transistor 64 which in-turn activates MOSFET 68 (i.e., a power control switching device) in the saturation mode, to provide low beam filament 69a with the necessary power to produce a reduced light intensity. In the preferred embodiment, MOSFET 68 is a Siemens BTS650P metallic oxide semiconductor field effect transistor which has a relatively low resistance drain-to-source ($R_{DS(ON)}$) value. MOSFET 68 is connected to both system voltage 80 and to low beam filament 69a which is contained within headlamp assembly 69.

A proportional sense resistor 67 is provided to assist in detecting whether low beam filament 69a is operational (i.e. not "burnt out"). A known amount of current is expected to flow through the sense resistor 67 which produces an expected voltage across it. If the expected voltage across the sense resistor 67 is not within the acceptable threshold voltage limits, then microprocessor 51 establishes that the low beam filament 69a is inoperable.

When such a failure has been detected, microprocessor 51 activates pre-driver transistor 72 which in-turn activates MOSFET 76 in a pulse width modulation mode. Based on the pulse width modulation mode, MOSFET 76 pulses the high beam filament 69b to produce a light intensity equivalent to the light intensity of the failed low beam filament. The rationale is to replace an inoperable headlamp filament with a known functioning filament to allow for safe driving at night.

Upon detection of a failed filament, microprocessor 51 communicates the status of the failed filament via communication bus to the vehicle's driver via a display (e.g., a warning light). Moreover, this information can be communicated to a vehicle service person when the service person connects to network 42 in order to request diagnostic information regarding a vehicle to be serviced.

For performing DRL operations, MOSFET 76 pulses the high beam filament 69b to operate the filament at a reduced light intensity that meets the Daytime Running Lamps (DRL's) requirements based upon pulse width modulation as provided by microprocessor 51. The light output is determined based on the vehicle build configurations in order to accommodate for vehicle height requirements and to accommodate specific country requirements (U.S., Canada, etc.). The adaptability is preferably automatically determined by the system based on bus message information contained in the appropriate bus messages that contain VIN, body style, and other such information.

For performing power balancing operations, MOSFET 76 pulses the high beam filament 69b to operate the filament at a reduced light intensity that allows the power being supplied to the vehicle's headlamps to remain within a predetermined threshold. The voltage of the vehicle's electrical system is monitored via connection 81 so that an unbalanced condition can be determined by the present invention.

Figure 5A:
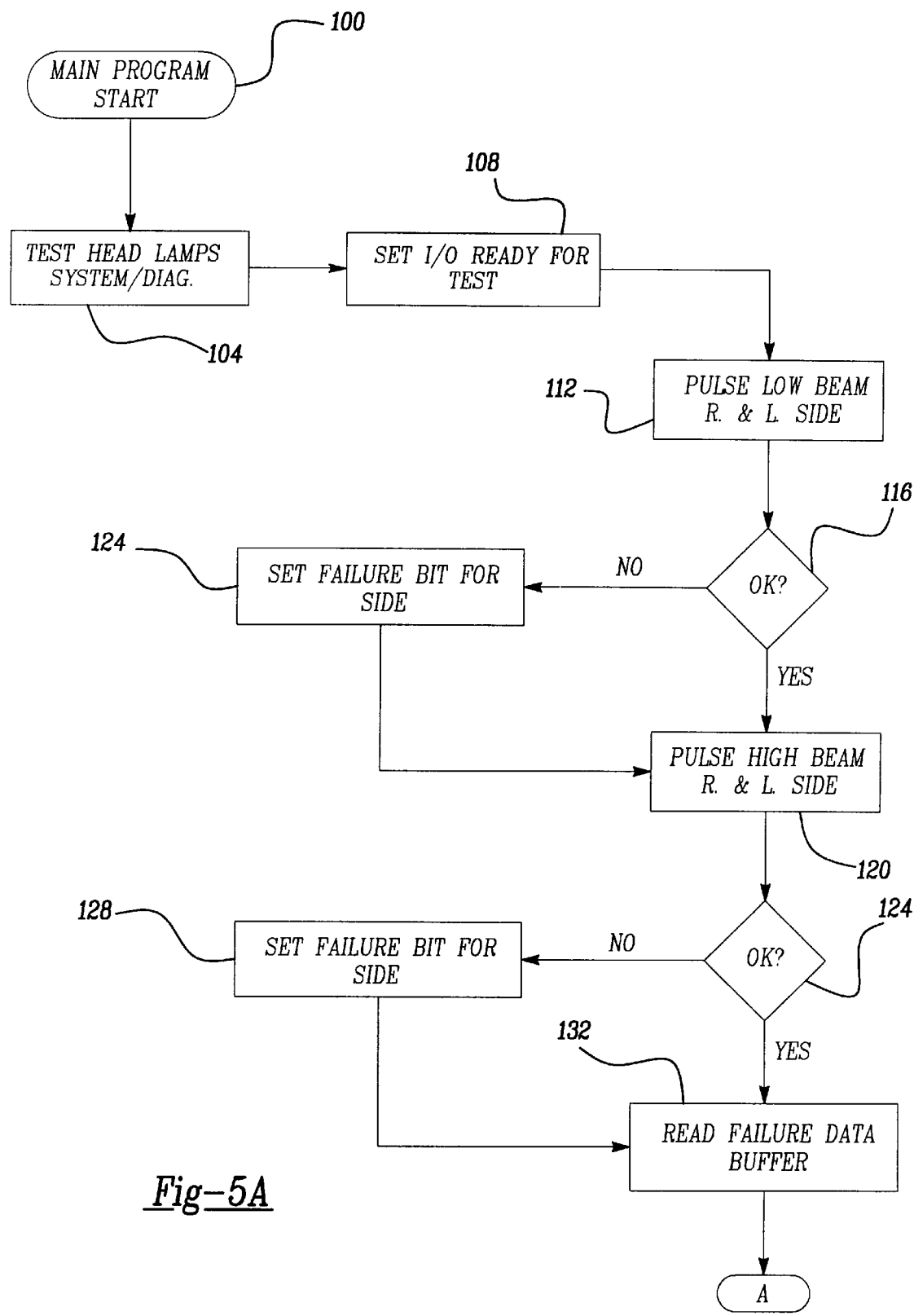

FIGS. 5a–5b depict the processing steps involved in performing diagnostics for the low and high beam filaments in order to determine if one or both of the filaments is inoperational. Start indication block 100 indicates that the headlamp system is to be tested. This testing is performed preferably when the vehicle is powered up (i.e., when the ignition is on) or when the network is active and the ignition is off.

Process block 108 first clears any failure data that had been left in the microprocessor's buffer from previous microprocessor activities. The microprocessor pulses the low-beam right and left sides of the vehicle momentarily by sending out control pulses through the control I/O port at process block 112. Preferably, these control pulses are relatively short and not visible to a person who may be viewing the pulsed headlamps.

If the expected voltage (or current) is detected by the proportional resistor as determined by decision block 116, then processing continues at process block 120. However, if the voltage (or current) is not as expected, then process block 124 sets the failure bit of the filament that has been detected as failed. This failure information is used to indicate that the high beam filament is to be used at the low beam's light intensity. In such a situation, PWM is utilized in accordance with the teachings of the present invention.

Process block 120 then pulses the high beam on the right and left side and performs similar processing at blocks 124 and 128 as it did for the low beams. Process block 132 reads the failure data from the buffers as populated by process blocks 124 and 128. If decision block 136 determines that the headlamps are fully operational, then the diagnostic processing terminates at process block 140.

Referring to FIG. 5b, if decision block 136 determines that a light filament within a headlamp is inoperational, then process block 144 is executed wherein a report is prepared and its format is established in accordance with the J1850 protocol. Process block 148 sends the report to all appropriate systems through the network in a J1850 message format protocol. Processing terminates at termination block 150.

Figure 6:
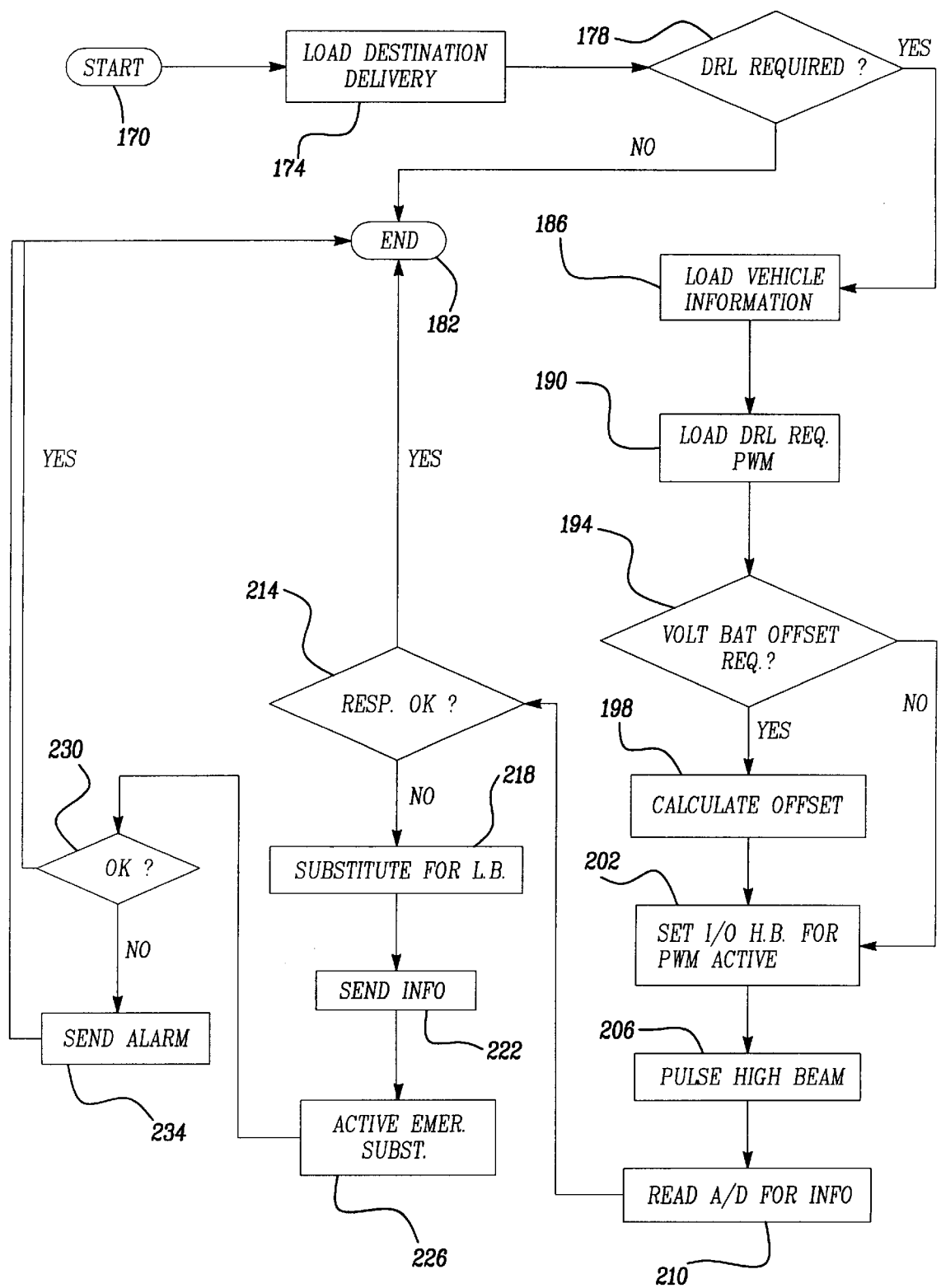
FIG. 6 is a flow chart depicting the processing steps involved in operating the daytime running lamp system in accordance with the teachings of the present invention.

FIG. 6 depicts the processing steps involved in initializing a vehicle to perform DRL operations in accordance with the teachings of the present invention. Start indication block 170 indicates that process block 174 is to be executed. Process block 174 loads into memory the country to which the vehicle is to be delivered. The country information is preferably derived from the vehicle's identification number (VIN). Based upon the destination country, decision block 178 determines whether DRL operations are required. If DRL operations are not required, then processing terminates at termination block 182. However, if DRL operations are required, then processing continues at process block 186.

Process block 186 loads such vehicle information as vehicle model, build configuration (4×2 or 4×4), and body style. Positional information, such as height of the vehicle (i.e., headlamp height from ground) is derived.

Based upon the destination country and the headlamp positional information, process block 190 preferably loads from a look-up table the required PWM factor in order to adjust the PWM signals to a high beam filament to conform to a particular country's DRL light intensity standards.

Additionally, decision block 194 determines whether a voltage offset is required. An offset may be required when the battery is over charged and therefore the PWM would have to be adjusted to compensate for an over charged battery. If decision block 194 determines that an offset is not required, then processing continues at process block 202. However, if an offset is required, then the offset is determined by process block 198.

Process block 202 initializes the high beam filament in order to perform the DRL operations. Process block 206 pulses the high beam filament and process block 210 reads from the A/D port the feedback from the pulsed high beam filament.

If the response from the pulsed high beam filament is satisfactory as determined by decision block 214, then the DRL initialization processing steps terminate at termination block 182. However, if the response is not satisfactory, then process block 218 configures the system so that the low beam filaments are used. Process block 222 communicates this status to other controllers on the network, and process block 226 activates the emergency low beam substitution operations.

If the emergency substitution operations are satisfactory as determined by decision block 230, then processing terminates at termination block 182. However, if they are not satisfactory, then process block 234 sends an alarm signal across the network to the other controllers to indicate that the DRL operations cannot be performed. Preferably, the vehicle driver is informed of such a situation via a warning light indicator. Processing ends at termination block 182.

FIG. 7 is a flow chart that depicts the processing steps involved in performing power balancing in accordance with the teachings of the present invention. Start indication block 280 indicates that process block 284 is to be executed wherein the voltage from the vehicle's electrical system is determined for each headlamp. If the supplied voltage is within a predetermined threshold as determined by decision block 288, then processing ends at termination block 296. In the preferred embodiment, the predetermined threshold is approximately 13 volts plus or minus five percent of 13 volts.

However, if the supplied voltage is not within a predetermined threshold as determined by decision block 288, then processing continues at process block 292. Process block 292 begins to pulse width modulate the voltage being supplied so that the voltage is brought back within the predetermined threshold.

Power balancing is invoked when the supplied voltage from the vehicle's electrical system (e.g., vehicle's battery and alternator) does not satisfy a predetermined threshold. One situation which produces such a condition is when the temperature varies. Temperature affects the vehicle's electrical system such that, for example, the supplied voltage is approximately 14.75 volts when the temperature is at approximately −10° Fahrenheit.

Various other advantages of the present invention will become apparent to those skilled in the art after having the benefit of studying the foregoing text and drawings, taken in conjunction with the following claims.

It is claimed:

1. A vehicle lighting control circuit, comprising:
   a computer storage device for storing data related to daylight running light operational requirements;
   a vehicle lighting element for producing light at a first light intensity;
   a pulse width modulation adjuster connected to said computer storage device and to said vehicle lighting element for generating a pulse width modulation control signal to control said vehicle lighting element based upon said stored daylight running light operational requirements, said vehicle lighting element operating at a reduced light intensity in accordance with said generated pulse width modulation control signal, said stored daylight running light operational requirements includes associating a light intensity indicative value with positional information of said lighting element with respect to a predetermined reference location on the vehicle.

2. The vehicle lighting control circuit of claim 1 further comprising:

an electrical system for supplying electrical power to said lighting element, said electrical system having a voltage level;

said pulse width modulation control signal to control said lighting element being adjusted based upon said voltage level of said electrical supply system in order to operate said vehicle lighting element at said reduced light intensity.

3. The vehicle light control circuit of claim 1 wherein said stored daylight running light operational requirements includes associating a light intensity indicative value with at least one predetermined geographical location.

4. A method for performing daylight running light operations in a vehicle, comprising the steps of:

storing data related to daylight running light operational requirements in a computer storage device;

producing light at a first light intensity via a vehicle lighting element; and generating a pulse width modulation control signal to said vehicle lighting element based upon said stored daylight running light operational requirements, said vehicle lighting element operating at a reduced light intensity in accordance with said generated pulse width modulation control signal, wherein said stored daylight running light operational requirements includes associating a light intensity indicative value with at least one predetermined geographical location.

5. The method of claim 4 wherein said stored daylight running light operational requirements includes associating a light intensity indicative value with positional information of said lighting element with respect to a predetermined reference location on the vehicle.

6. The method of claim 4 further comprising the step of:

supplying electrical power to said lighting element via an electrical system, said pulse width modulation control signal to said lighting element being adjusted based upon an electrical characteristic of said electrical supply system in order to operate said vehicle lighting element at said reduced light intensity.

* * * * *